(12) United States Patent
Wilson et al.

(10) Patent No.: US 12,461,117 B2
(45) Date of Patent: Nov. 4, 2025

(54) SAMPLE RECEIVING SYSTEM

(71) Applicant: Laboratory Corporation of America Holdings, Burlington, NC (US)

(72) Inventors: David Wilson, Avon, CT (US); Jay Krajewski, Windsor, CT (US); Kevin Meyer, Simsbury, CT (US)

(73) Assignee: Laboratory Corporation of America Holdings, Burlington, NC (US)

( * ) Notice: Subject to any disclaimer, the term of this patent is extended or adjusted under 35 U.S.C. 154(b) by 187 days.

(21) Appl. No.: 17/744,103

(22) Filed: May 13, 2022

(65) Prior Publication Data

US 2022/0341953 A1 Oct. 27, 2022

Related U.S. Application Data

(63) Continuation of application No. 16/263,895, filed on Jan. 31, 2019, now Pat. No. 11,372,011.

(Continued)

(51) Int. Cl.
*G01N 35/00* (2006.01)
*B01L 9/06* (2006.01)
*G01N 35/04* (2006.01)

(52) U.S. Cl.
CPC .......... *G01N 35/0092* (2013.01); *B01L 9/06* (2013.01); *G01N 35/00732* (2013.01); *G01N 35/04* (2013.01); *B01L 2300/021* (2013.01); *B01L 2300/0609* (2013.01); *B01L 2300/0861* (2013.01); *B01L 2300/0864* (2013.01); *G01N 2035/00752* (2013.01); *G01N 2035/0096* (2013.01); *G01N 2035/0406* (2013.01); *G01N 2035/0465* (2013.01);

(Continued)

(58) Field of Classification Search
CPC ......... G01N 35/0092; G01N 35/00732; G01N 35/04; B01L 9/06
See application file for complete search history.

(56) References Cited

U.S. PATENT DOCUMENTS 6,220,451 B1   4/2001  Hoffmann
6,435,333 B1 * 8/2002  Sala ................... B65G 47/1457
                                              198/383

(Continued)

FOREIGN PATENT DOCUMENTS

DE    2519111    7/1976
DE    4301131    7/1994

(Continued)

OTHER PUBLICATIONS

PCT/US2019/016059, International Preliminary Report on Patentability, Aug. 13, 2020, 12 pages.

(Continued)

*Primary Examiner* — Lyle Alexander
*Assistant Examiner* — Dwan A Gerido
(74) *Attorney, Agent, or Firm* — Kilpatrick Townsend & Stockton LLP

(57) ABSTRACT

Disclosed are high-throughput vessel receiving systems and methods of receiving sample vessels, such as samples stored in test tubes. A system for receiving a plurality of individual vessels that each contains a sample, and systems and apparatus for guiding, reorienting, collecting, and transporting a plurality of articles, including vessels, are disclosed.

14 Claims, 13 Drawing Sheets

Related U.S. Application Data

(60) Provisional application No. 62/624,450, filed on Jan. 31, 2018, provisional application No. 62/624,530, filed on Jan. 31, 2018, provisional application No. 62/624,359, filed on Jan. 31, 2018, provisional application No. 62/624,419, filed on Jan. 31, 2018, provisional application No. 62/624,486, filed on Jan. 31, 2018.

(52) U.S. Cl.
CPC .............. *G01N 2035/047* (2013.01); *G01N 2035/0472* (2013.01); *G01N 2035/0484* (2013.01)

(56) References Cited

U.S. PATENT DOCUMENTS

| | | | |
|---|---|---|---|
| 6,599,476 B1* | 7/2003 | Watson | G01N 35/10 141/69 |
| 2006/0124432 A1* | 6/2006 | Marti Mercade | B65G 47/244 193/44 |
| 2009/0129990 A1 | 5/2009 | Kokawa et al. | |
| 2010/0288056 A1 | 11/2010 | Clark et al. | |
| 2011/0124028 A1 | 5/2011 | Robinson et al. | |
| 2013/0085597 A1 | 4/2013 | Koch et al. | |
| 2013/0123089 A1 | 5/2013 | Johns et al. | |
| 2014/0037517 A1 | 2/2014 | Takai | |
| 2014/0318927 A1 | 10/2014 | Pedrazzini | |
| 2016/0229642 A1 | 8/2016 | Mulet Valles | |
| 2017/0152109 A1 | 6/2017 | Mizuki | |

FOREIGN PATENT DOCUMENTS

| | | |
|---|---|---|
| EP | 3128314 | 2/2017 |
| FR | 2957671 | 9/2011 |
| JP | 2008268033 | 11/2008 |
| JP | 2011209045 | 10/2011 |
| WO | 2017/047240 | 3/2017 |

OTHER PUBLICATIONS

PCT/US2019/016059, International Search Report and Written Opinion, May 3, 2019, 16 pages.
PCT/US2019/016062, International Preliminary Report on Patentability, Aug. 13, 2020, 11 pages.
PCT/US2019/016062, International Search Report and Written Opinion, May 6, 2019, 15 pages.
PCT/US2019/016067, International Preliminary Report on Patentability, Aug. 13, 2020, 9 pages.
PCT/US2019/016067, International Search Report and Written Opinion, May 3, 2019, 14 pages.

\* cited by examiner

SAMPLE RECEIVING SYSTEM

PRIORITY

The present application is a continuation of U.S. patent application Ser. No. 16/263,895, filed Jan. 31, 2019, which claims priority to U.S. Provisional Patent Application No. 62/624,359, filed Jan. 31, 2018, U.S. Provisional Patent Application No. 62/624,450, filed Jan. 31, 2018, U.S. Provisional Patent Application No. 62/624,486, filed Jan. 31, 2018, U.S. Provisional Patent Application No. 62/624,419, filed Jan. 31, 2018, and U.S. Provisional Patent Application No. 62/624,530, filed Jan. 31, 2018, all of which are hereby incorporated by reference in their entireties herein.

FIELD

Described herein are systems for receiving a plurality of sample vessels and methods of receiving a plurality of sample vessels.

BACKGROUND

A need exists for sample vessel receiving systems capable of consistently individually receiving a large volume of sample vessels from an upstream process, with the vessel segregated according to a parameter. Described herein are new systems and methods to efficiently receive a large volume of sample vessels from various upstream processes at a high rate of speed.

SUMMARY

Described herein are systems and methods to receive and segregate a large volume of vessels from an upstream system or process at a high rate of speed with minimal human interaction. In some embodiments, the systems and methods guide and reorient an article from an upstream system to a collection point. In some cases, the article may be a vessel or sample tube. The invention may be embodied in a variety of ways.

In some embodiments, a system for receiving a plurality of vessels may comprise a collection bank configured to receive a plurality of vessels, where each vessel is configured to hold a sample and wherein the collection bank comprises: a plurality of alignment components, where each of the plurality of alignment components is configured to individually direct each of the plurality of vessels from an entry position to a collection point within the collection bank; and a plurality of collection containers comprising an opening, where each of the plurality of containers is configured to receive and hold at least some of the plurality of vessels at the collection point. In certain embodiments, a system for receiving vessels may comprise a collection bank configured to receive at least one vessel, where the ay least one vessel is configured to hold a sample and where the collection bank may comprise at least one alignment component and at least one collection container comprising an opening, where the at least one collection container is configured to receive and hold the at least one vessel at the collection point. In an embodiment, samples may be directed to a particular collection point based on the sample type or some other identifying indicia. In some embodiments, the system may further comprise a plurality of encasing panels adjacent to each of the plurality of alignment components, where each of the plurality of encasing panels is configured to enclose each of the plurality of alignment components. In some embodiments, the system may further comprise a support structure configured to house each of the plurality of alignment components, encasing panels, and collection containers. In some embodiments, the plurality of alignment components and encasing panels may be configured in a row and positioned in a vertical orientation with an encasing panel separating each of the plurality of alignment components in the row and an encasing panel at each end of the row.

In certain embodiments, the support structure may comprise at least one container shelf configured to hold the plurality of collection containers. In some embodiments, each of the plurality of collection containers may be configured to be associated with a chute formed by one of the plurality of encasing panels and one of the plurality of alignment components, where the association is based on a sorting parameter of each of the plurality of vessels.

In some cases, each of the plurality of encasing panels and alignment components may be configured to contact each other to form a chute and reorient a vessel from a substantially horizontal orientation to a substantially vertical orientation to facilitate entry into a collection container. In some examples, each of the plurality of alignment components comprises a first side and a second side. In some embodiments, the first side and second side of each of the plurality of alignment components each may comprise a raised portion, where the raised portion is configured to provide a contact surface to reorient and funnel each of the plurality of vessels.

In some embodiments, the collection system may include an apparatus to guide vessels within the system. In certain examples, an apparatus for guiding an article may comprise a raised portion in a substantially Y-shape and a first side and a second side, where the raised portion provides a contact surface for the article and is configured to direct an article from a top of the apparatus to an outlet at the bottom of the apparatus. In some cases, the apparatus further comprises a two-step feature to further direct and reorient each article entering the apparatus from a rear entry point.

In some embodiments, the collection system may include an apparatus to collect and transport vessels. In certain examples, a collection-transport apparatus may collect and transport an article from a collection point to a downstream process (e.g., analysis station). In some cases, the article may be a vessel or sample tube. The collection-transport apparatus may comprise a substantially rectangular base and walls connected to the base, where the base and walls define an interior volume of the apparatus and the walls comprise a front wall, a rear wall, a first side wall, and a second side wall, a top connected to the first side wall and second side wall, where the top comprises a first top surface and a second top surface that are substantially perpendicular to the first side wall and second side wall, a first handle connected to the first top surface and second top surface, and a second handle connected to the rear wall of the apparatus. In some cases, the apparatus may comprise a panel that defines a substantially rectangular opening, where the apparatus configured to receive a plurality of implements through the opening.

Also disclosed herein are methods for receiving a plurality of vessels using the systems described herein. In some examples, a method of using a system for receiving at least one vessel may comprise comprising delivering at least one vessel to an entry point of the system and dispersing the at least one vessel into at least one collection container. In some examples, a method of using a system for receiving a plurality of vessels may comprise comprising delivering a plurality of vessels to an entry point of the system and dispersing the plurality of vessels into a plurality of collection containers. The system may comprise (i) a plurality of alignment components, where each of the plurality of alignment components is configured to individually direct at least some of the plurality of vessels from an entry position to a collection point within the collection bank; (ii) a plurality of encasing panels adjacent to each of the plurality of alignment components, where each of the plurality of encasing panels is configured to enclose each of the plurality of alignment components; (iii) a plurality of collection containers comprising an opening, where each of the plurality of containers is configured to receive and hold the at least some of the plurality of vessels at the collection point; and (iv) a support structure configured to house each of the plurality of alignment components, encasing panels, and collection containers, where each vessel is configured to hold a sample. In an embodiment, samples are directed to a particular collection point based on the sample type or some other identifying indicia.

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim. Further aspects, objects, and advantages of the invention will become apparent upon consideration of the detailed description and figures that follow.

BRIEF DESCRIPTION OF THE FIGURES

The present disclosure may be better understood with reference to the accompanying figures, in which embodiments of the invention are shown. This invention may, however, be embodied in many different forms and should not be construed as limited to the embodiments set forth herein; rather, these embodiments are provided so that this disclosure will be thorough and complete, and convey the scope of the invention to those skilled in the art.

DETAILED DESCRIPTION OF THE INVENTION

Figure 1:
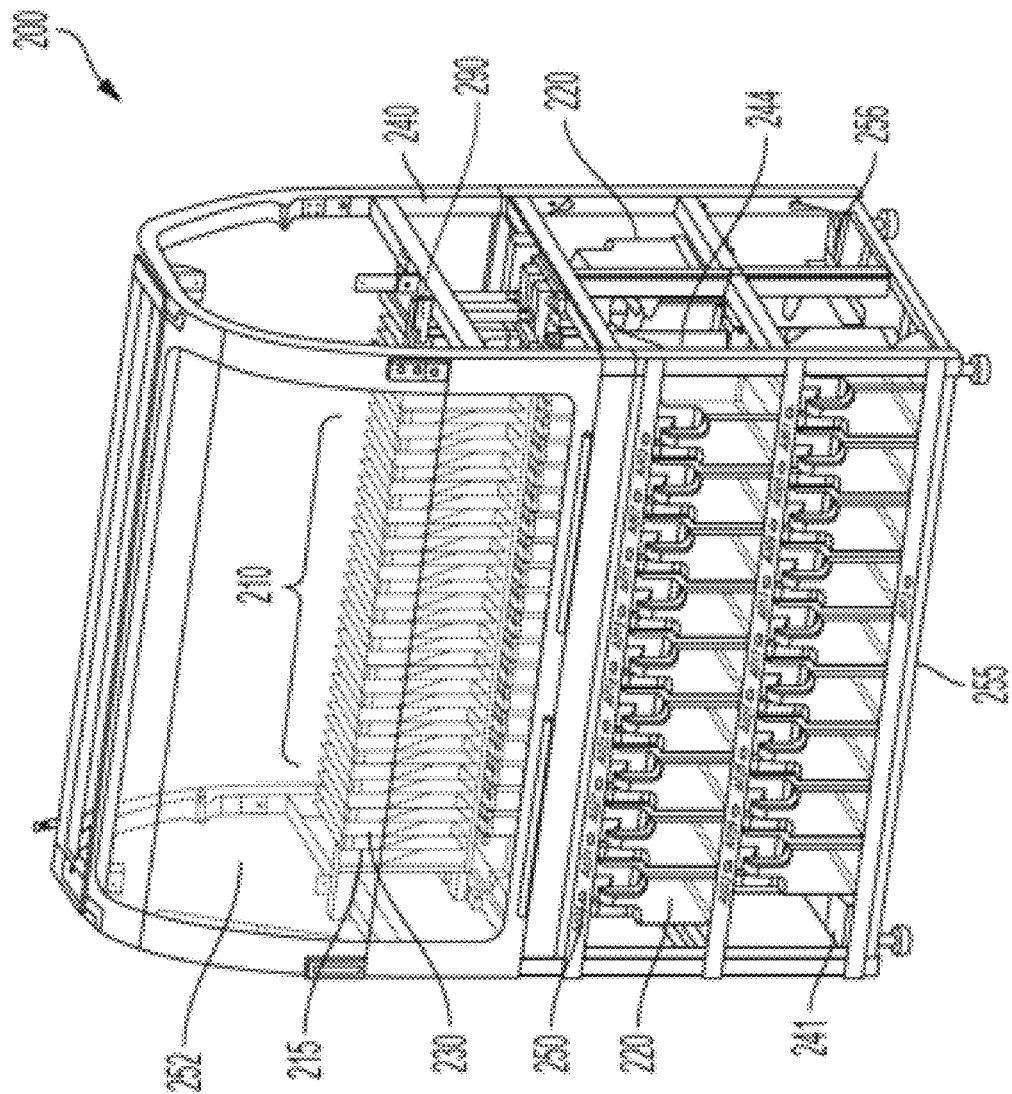
FIG. 1 is a perspective view of a collection bank comprising an array of chutes according to one embodiment described herein.

The use of "including," "comprising," "having," "containing," "involving," and/or variations thereof herein, is meant to encompass the items listed thereafter and equivalents thereof as well as additional items.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Described herein are systems and methods for receiving a plurality of vessels. The invention may be embodied in a variety of ways.

Vessel receiving systems capable of consistently individually receiving a large volume of sample vessels from an upstream process can greatly improve operating costs and efficiency. For example, samples that are used for research and/or analysis applications may be placed within vessels and sent to a testing facility for processing and analysis. Some of these facilities may receive tens of thousands of individual samples vessels daily. By using an automated sorting system in conjunction with an automated receiving system, the sorting of the large number of vessels at a testing facility may be completed with greater speed and accuracy, thereby improving the overall costs and reliability of a testing facility. Other upstream processes may also benefit from a high speed system to receive and segregate vessels in an individual manner and for further processing.

In certain embodiments, the invention may comprise a system for receiving a plurality of vessels. A system for receiving a plurality of vessels may comprise: a collection bank configured to receive a plurality of vessels. The collection bank may comprise a plurality of chutes. The chutes may be formed by arranging an alignment component adjacent to an encasing panel. In some cases, a plurality of alignment components may be arranged adjacent to a plurality of encasing panels to form a plurality of chutes. The alignment component may comprise raised portions configured to direct or funnel a vessel from a first location to a second location. When an encasing panel is arranged adjacent to an alignment component, the encasing panel may contact the raised portions and a chute is formed. When the alignment component is in contact with an encasing panel, one or more gaps, openings, or entrances may be accessible at the top and a gap, opening, or exit may be accessible at the bottom of the chute. A vessel may enter the chute from either of the top openings, travel through the chute where the vessel contacts the raised portion of the alignment component, and exit the chute at the bottom opening. As the vessel travels through the chute, the orientation of the vessel may be altered through contact with the raised portions. For example, in certain embodiments, a vessel may enter a top opening in a substantially horizontal orientation according to a longitudinal axis of the vessel, contact a diverter located between the one or more openings and/or contact a two-step feature of the raised portion which changes the orientation from horizontal toward vertical to direct the vessel through the chute. The raised portion of the alignment component may become closer together toward the bottom of the alignment component such that the width of the chute decreases from top to bottom. As the vessel proceeds through the chute, the vessel may continue to contact the raised portions and continue to change orientation until the vessel is in a substantially vertical orientation according to a longitudinal axis at the bottom opening or exit of the exit of the chute.

The collection bank may further comprise a plurality of collection containers comprising an opening and a support structure configured to house each of the plurality of alignment components, encasing panels, and collection containers. In some embodiments, each of the plurality of alignment components may be configured to individually direct each of the plurality of vessels from an entry position to a collection point within the collection bank. In some embodiments, each of the plurality of encasing panels may be configured to enclose each of the plurality of alignment components.

In certain embodiments, each of the plurality of containers may be configured to receive and hold each of the plurality of vessels at a particular collection point. In some cases, each of the plurality of containers may be configured to transport the collected vessels for additional processing or analysis. In some cases, each vessel may be configured to hold a sample.

In some embodiments, each of the plurality of alignment components may be configured to reorient each of the plurality of vessels from a substantially horizontal position to a substantially vertical position. In certain embodiments, an alignment component may be bidirectional. In such cases, the alignment component may comprise a first side and a second side with a divider separating the first side from the second side. The first side and the second side may each comprise raised portions that form a chute when adjacent to an encasing panel. In other embodiments, an alignment component may comprise only one side with raised portions while the other side has no raised portion similar to an encasing panel.

In certain embodiments, the plurality of alignment components and encasing panels may be configured in a row and positioned in a vertical orientation with an encasing panel separating each of the plurality of alignment components in the row and an encasing panel at each end of the row. In some examples, the plurality of encasing panels and alignment components are configured to contact each other to form a plurality of chutes that are each configured to reorient a vessel from a substantially horizontal orientation to a substantially vertical orientation for delivery into a collection container. In some cases, the reorientation can provide for improved movement of the vessels within the system, such as faster processing times and fewer vessel obstructions, to increase efficiency of the collection system. For example, in an embodiment, the reorientation prevents vessels from blocking the opening of the collection container as can happen if the vessels are not oriented in a substantially vertical orientation (e.g., having the length of the vessel perpendicular to the container opening).

In some embodiments of the alignment component, the raised portion of a first side may different than the raised portion of a second side. In some embodiments, the raised portion of a first side may the same as the raised portion of a second side. In some cases, the chute formed by the first side may direct vessels to a proximate area of the collection system while a chute formed by the second side may direct vessels to a distal area of the collection system. In some embodiments, the depth of the raised portion is greater than the vessel diameter to facilitate orientation of the vessel In certain embodiments, the first side and second side of each of the plurality of alignment components each comprise a raised portion, where the raised portion may be configured to form a chute and provide a contact surface to reorient and funnel each of the plurality of vessels within the chute towards the opening of a collection container.

In some embodiments, the support structure may comprise at least one container shelf configured to hold the plurality of collection containers. In certain embodiments, the shelf may comprise a series of slots configured to align with the opening of each of the plurality of collection containers when the containers are placed in the system. Such slots may facilitate aligning the collection container openings with the exit point of the alignment component. Additionally, such slots may provide stability for the collection containers on the shelf. In some embodiments, the collection bank comprises an upper container shelf and a lower container shelf. In certain embodiments, the slots of the upper and lower container shelf may be offset such that the upper slots are approximately one half a container width offset from the lower slots. This offset can allow for a more compact arrangement of chutes and collection containers to help reduce the footprint of the collection system.

In some embodiments, the collection bank further comprises at least one positioning bar configured to align each of the plurality of alignment components in the support structure. In some cases, the collection bank may comprise a set of upper positioning bars and a set of lower positioning bars. In some embodiments, the collection bank may further comprise a connector tube, where the connector tube is configured to protrude from the slots in the container shelf and connect the opening of each of the plurality of collection containers to a designated chute.

In some embodiments, the collection unit comprises a cover configured to provide access to the collection containers and alignment components. In one example, the cover panel may be easy to open, yet provide protection from dust and other substances and prevent foreign objects from entering the collection unit. In certain examples, the cover panel may include gull wing door or other types of covers. Optionally, the cover may provide visibility to the system when the cover is closed.

In certain embodiments, the plurality of alignment components and encasing panels may be configured to align in a row on the support structure such that a pair of alignment components and encasing panels produce a confined space or chute configured to funnel vessels from the top of each of the plurality of alignment components to the bottom of each of the plurality of alignment components. In an embodiment, identifying indicia on the vessel is used to determine which vessels enter which chute. In some examples, the bottom outlet of the chute may be approximately the same size as the opening of one of the collection containers and a connector tube. Optionally, the containers are arranged on a support structure that comprises a top and a bottom container shelf. In some cases, each of the plurality of alignment components has a first side and a second side, where the first side of each of the plurality of alignment components and encasing panels funnel each of the plurality of vessels through a chute to a designated collection container staged on the front side of the system and the second side of each of the plurality of alignment components and encasing panels funnel each of the plurality of vessels through a chute to designated collection container staged on the rear side of the system. In some cases, the connector tube may be configured to protrude from the slots in each container shelf and connect the opening of each of the plurality of collection containers to the confined space of each pair of the plurality of alignment components and encasing panels.

In some examples, an inlet of the chute may be wider than an outlet of the chute. In certain examples, the distance between the raised portion at the top of the chute may approximate the length of a tube and the distance between the raised portion at the bottom may approximate the width of the tube. For example, for typical clinical tubes the inlet of the chute may range from 13 to about 20 cm. The width of the outlet may approximate the diameter of the vessel that is being delivered via the chute (e.g., about 1 cm to about 2.5 cm). In this way, the chute may deliver vessels that are held in a first position (e.g., substantially horizontal) to a position which is about 90 degrees from the original orientation (e.g., substantially vertical).

In some embodiments, each chute may be configured to direct each of the plurality of vessels from a plurality of entry points to a single collection point. In some embodiments, the chute further comprises a diverter configured to direct each of the plurality of vessels to a front or rear section of each alignment component. In certain embodiments, the chute further comprises a two-step feature at the rear side to further direct and reorient each of the plurality of vessels entering the chute from a rear entry point. In some embodiments, the chute may further comprise a substantially vertical section and the diverter may be angled away from the two-step feature. In some embodiments, a diverter on the second side of the alignment component may be substantially diamond-shaped, but other shapes may be used. In some examples, each of the plurality of alignment components further comprises a notch at the bottom of the front edge configured to align the plurality of alignment components within the system.

In some embodiments, an apparatus for guiding an article, may comprise a raised portion in a substantially Y-shape and a first side and a second side, wherein the raised portion provides a contact surface for the article and is configured to direct an article from a top of the apparatus to an outlet at the bottom of the apparatus. In some embodiments, the raised portion forming the chute ranges from 1 to about 10 cm in depth (i.e., width from the first side to the second side). In certain embodiments, the chute may be about 3 cm to about 4 cm in depth.

Also described herein is an apparatus for collecting and transporting a plurality of vessels. The collection-transport apparatus may be embodied in a variety of ways. In some embodiments, the apparatus may comprise a substantially rectangular base and walls connected to the base, where the base and walls define an interior volume of the apparatus. The walls may comprise a front wall, a rear wall, a first side wall, and a second side wall. The apparatus may further comprise a top connected to the first side wall and second side wall, where the top comprises a first top surface and a second top surface that are substantially perpendicular to the first side wall and second side wall. In some embodiments, the substantially rectangular base may provide stability so that the container will not overturn, even when filled with sample vessels. In some embodiments, the sidewalls may be straight for efficient packing for accepting vessels for space-efficient systems, such as a high-throughput vessel sorting systems.

The apparatus may be portable and comprise a first handle connected to the first top surface and second top surface and a second handle connected to the rear wall of the apparatus. In certain embodiments, the first handle may be substantially coplanar with the first top surface of the apparatus. In some embodiments, the second handle may be substantially perpendicular to the first handle. Optionally, the first handle may be connected to the second handle. In some examples, the first handle aligns with the top of the apparatus for ease of carrying the apparatus, even when the container is filled with vessels. In some embodiments, the first handle may be hollow, and may be separated from the interior volume of the apparatus by the second top surface to prevent an implement vessel from entering the handle. The second handle may provide a secondary gripping point for transporting an apparatus that is filled or partially filled with vessels. The second handle may allow an operator of a vessel sorting system to remove the apparatus from a collection shelf along a horizontal path to decrease the space requirements of the sorting and collection system.

In some embodiments, the apparatus may further comprise a panel that defines an opening. The apparatus may be configured to receive a plurality of implements through the opening. In some examples, the implements comprise sample vessels, including biological sample vessels. In certain embodiments, the opening may be substantially rectangular in shape and the panel may be connected to the first top surface to the front wall. In other embodiments, the opening may be circular or oval in shape. In some cases, the panel with the opening may be positioned at an approximately 45 degree angle from the first top surface, and may be mated to a chute which may direct vessels into the apparatus. For example, the panel with the opening may be positioned at an approximately 30 degree, 35 degree, 40 degree, 45 degree, 50 degree, 55 degree, or 60 degree angle. In some embodiments, the angle of opening allows for horizontal movement of the apparatus away from a chute and connector tube without requiring movement or adjustment of the chute. Optionally, the panel may further comprise a lip at the edge of the opening, where the lip may be configured to mate with a cap.

The systems described herein may be configured to supply vessels having various shapes or dimensions. In some embodiments, each of the plurality of vessels may range in size from 75 millimeters (mm) to about 125 mm in length and about 8 to about 16 mm in diameter. For example, the vessel may be 8 mm, 10 mm, 12 mm, 14 mm, or 16 mm in diameter. For example, the vessel may be 75 mm, 80 mm, 90 mm, 100 mm, 110 mm, or 125 mm in length.

In some examples, a size of the opening ranges from 5 to 25 centimeters (cm) in width and 5 cm to 25 cm in height. In some examples, the width of the opening is 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, or 25 cm. In some examples, the height of the opening is 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, or 25 cm.

In some embodiments, the apparatus may comprise an injection moldable plastic, such as polyethylene terephthalate (PET), acrylonitrile butadiene styrene (ABS), nylon polyamide (PA), polycarbonate, polypropylene, low-density polyethylene (LDPE), acetal, or high impact polystyrene. In certain embodiments, the apparatus may be a collection container in a sorting system or collection system. In some examples, the apparatus may be a collection bin.

In certain embodiments, each of the plurality of collection containers may comprise a radio frequency identification (RFID) tag. In some cases, the RFID tag may be configured to receive location and vessel information when each of the plurality of containers is loaded in the support structure.

In certain embodiments, each of the plurality of collection containers may be configured to be associated with a chute formed by one of the plurality of encasing panels and one of the plurality of alignment components, where the association may be based on a sorting parameter (i.e., such as an indicia that identifies the type of sample or the type of analysis to be performed on the sample) of each of the plurality of vessels.

In some embodiments, the collection system may include various sensors to provide feedback on the system status to an operator or monitoring system. In some embodiments, the support structure may comprise an indicator light for each of the plurality of collection containers, where the light may be configured to provide feedback on an operating condition of each of the plurality of collection containers. Conditions monitored can include parameters such as fill level of a container, obstruction in a chute, and obstruction in a connector tube. Conditions of downstream processing may also be indicated in the collection system. For example, a downstream process can signal demand for vessels having a particular parameter.

Turning to the non-limiting figures, FIG. 1 shows one example of a collection bank 200 comprising an array of chutes 210. Each chute 210, formed by alignment components 215 and encasing panels 230, is configured to receive a vessel and direct the vessel to an assigned collection container 220. A positioning bar 290 can align or arrange the alignment components 215 within the support structure 240. In some examples, a vessel may pass through a connector tube 244 from a chute 210 to a collection container 220. Collection containers 220 may be stacked in multiple rows in a staggered orientation on both the front and back sides of the collection bank 200 on container shelves 241. In some examples, the entrance to the connector tubes may be arranged in an alternating arrangement associated with the exit direction of the chute 210, where a chute on a first side may direct to a proximate side 257 of the collection system and a chute on a second side may direct to a distal side 256 of the collection system. According to one embodiment, the system may have, for example, two rows of collection containers 220 and each row having nine collection containers 220, for a total of 36 collection containers 220 per collection bank 200. Other configurations are possible and the system may have fewer than two rows or more than two rows. Each row may include fewer than nine or more than nine containers. Each collection bank may have fewer than 36 or more than 36 containers. Optionally, each collection container 220 may have an associated indicator light 250 configured to convey information to an operator, such as the fullness of the container. an optional cover 252, Gullwing doors, or other types of cover, may provide dust protection and accessibility to a source of vessels (not shown) and the chutes 210.

Figure 2:
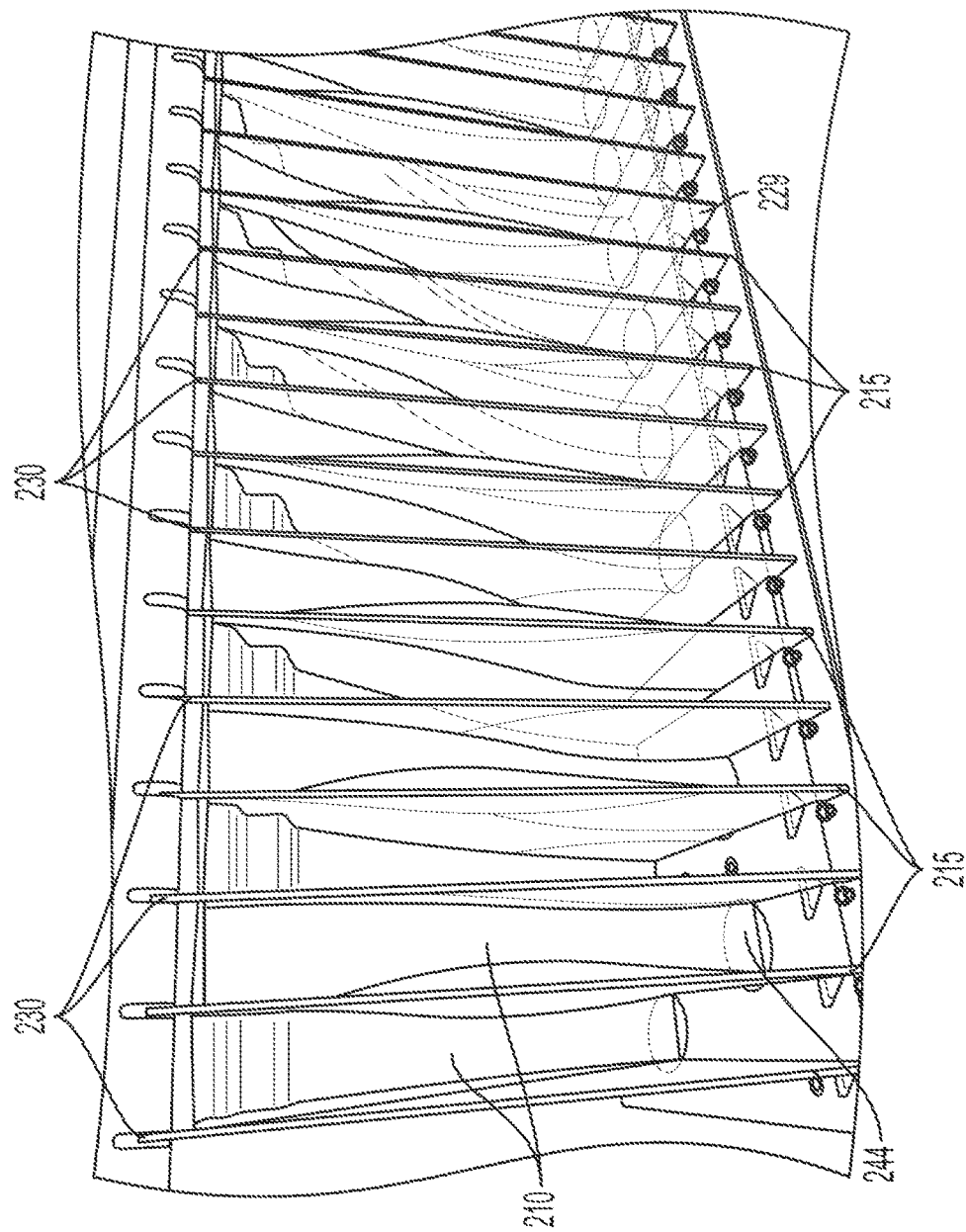
FIG. 2 shows a row of alignment components and encasing panels arranged to form a plurality of chutes according to one embodiment described herein.

FIG. 2 depicts a row of alternating alignment components 215 and encasing panels 230 arranged to form chutes 210. An exit of the chute 210 is directed to an entrance to a connector tube 244. In some examples, the entrance to the connector tube 244 may be arranged in an alternating arrangement associated with the exit direction of the chute 210, where a chute 210 on a first side of an alignment component 215 may direct to a proximate side of the collection bank 200 and a chute 210 on a second side of an alignment component 215 may direct to a distal side of the collection bank 200. The alignment component 215 and encasing panel 230 each may comprise a notch 229 that conforms to the edge of an alignment slot. The notch 229 can aid in equidistance spacing of the plurality of alignment components 215 and plurality of encasing panels 230. In some embodiments, the notch 229 can aid in alignment of the chute 210 and connector tube 244 and container 220 as only one corner of the alignment component 215 and encasing panel 230 may include a notch 229. In other embodiments, the alignment component 215 and encasing panel 230 may include more than one alignment component or an alternate alignment component.

Figure 3:
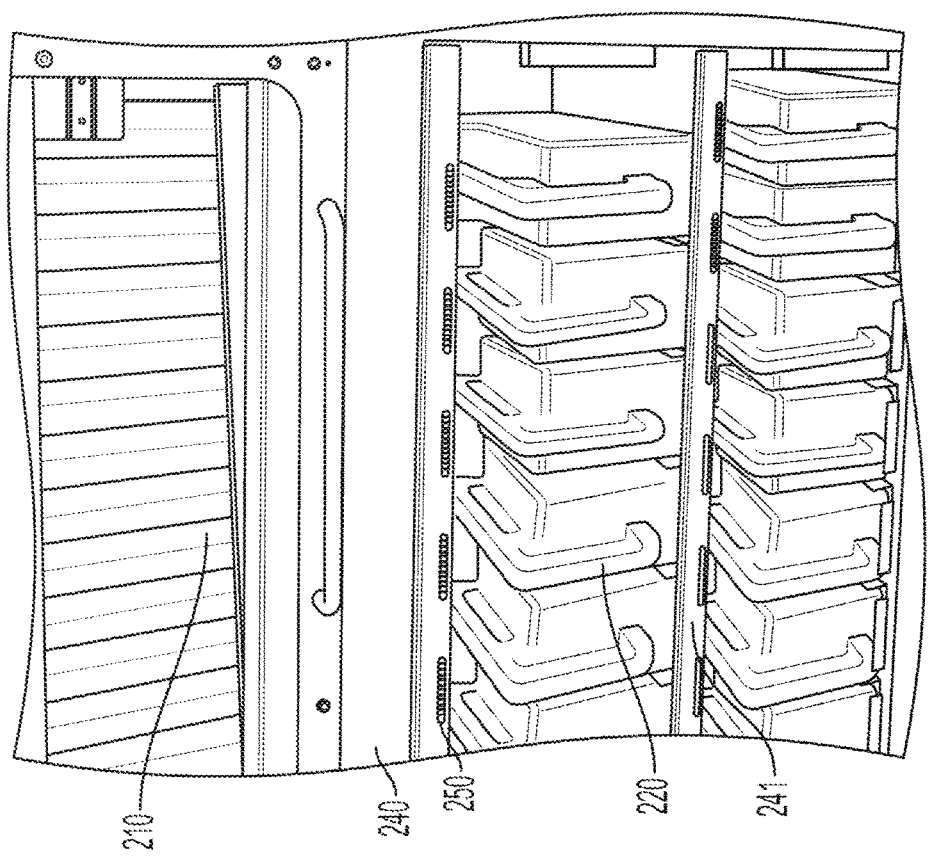
FIG. 3 shows rows of collection containers on a container shelf of a support structure with a row of chutes above according to one embodiment described herein.

FIG. 3 shows one embodiment of a collection system. FIG. 3 shows two rows of collection containers 220 on a container shelf 241 of a support structure 240 with a row of chutes 210 above. In some embodiments, a collection system may comprise a single row of containers or more than two rows of collection containers. The second handle of a collection container 220 is accessible to an operator or auxiliary system such that a collection container 220 may be removed from the collection system without movement, disruption, or disturbance to adjacent collection containers 220. An indicator light 250 can provide information on the status of the associated collection container 220.

Figure 4:
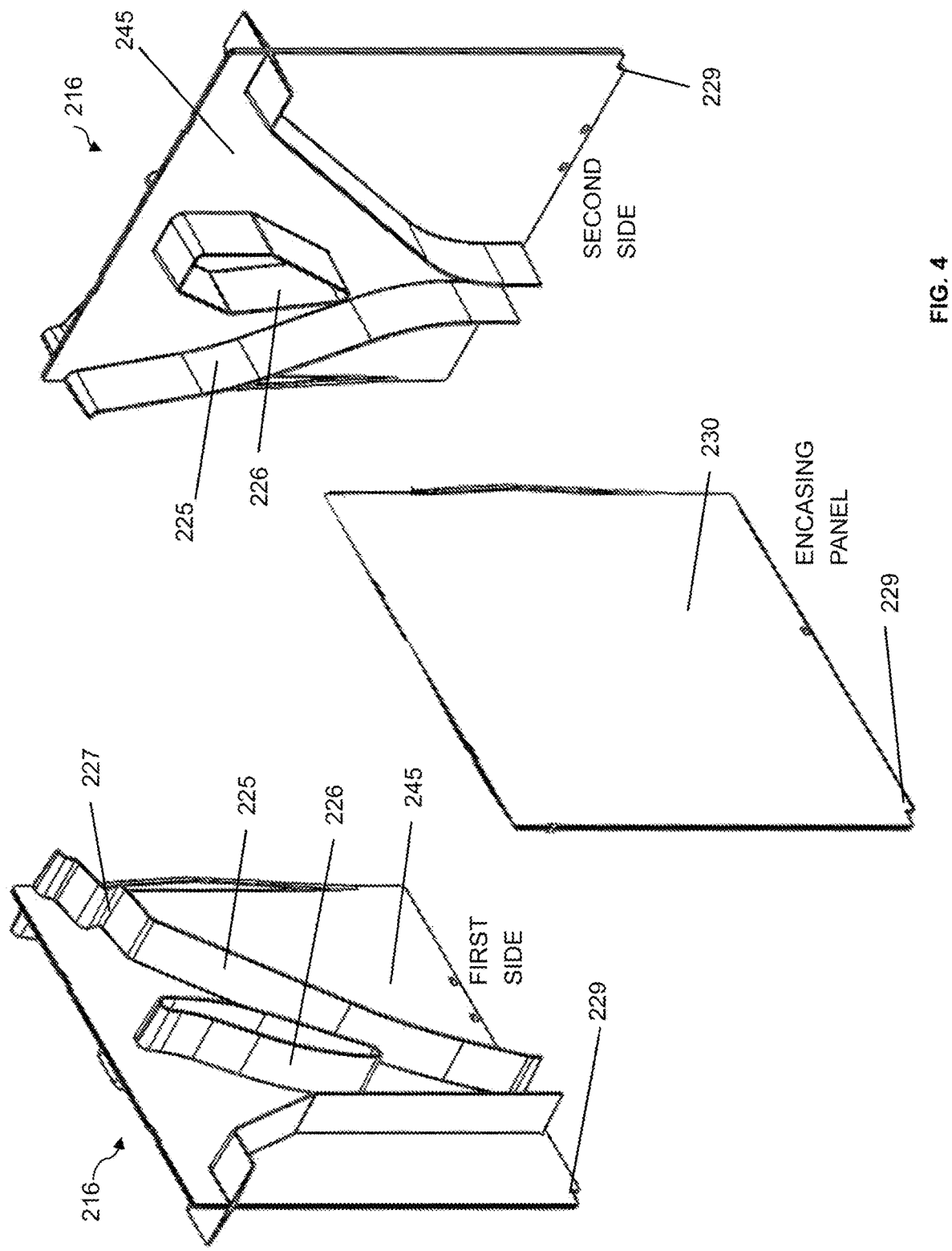
FIG. 4 shows a perspective view of a compact bidirectional alignment component and an encasing panel according to one embodiment described herein.

FIG. 4 shows a front and rear perspective view of a bidirectional alignment component 216, comprising a first side and a second side separated by a divider 245, and encasing panel 230 according to some embodiments of the system. The alignment component 216 comprises raised portions that form a chute 210 when adjacent to an encasing panel 230 to reorient a vessel to a substantially vertical orientation for transport to a collection container 220. The chute 210, formed by alignment component 216 and encasing panel 230, may be configured to accept vessels from more than one source. In some cases, a vessel may enter a chute 210 at either a proximate opening or a distal opening and funnel the vessel to a designated container 220 as assigned in the collection bank 200. In some cases, the raised portion of the alignment component 216 may have a substantially Y-shape. In some examples, the alignment component 216 may be bidirectional and comprise a diverter 226 on each side of the apparatus. In some examples, a first side of a bidirectional alignment component 216 may direct vessels to a separate area of the collection system than the second side of the bidirectional alignment component 216. In some cases, the encasing panel 230 comprises a notch 229 and is substantially planar to mate with a bidirectional alignment component 216 to form a chute 210.

Figure 5:
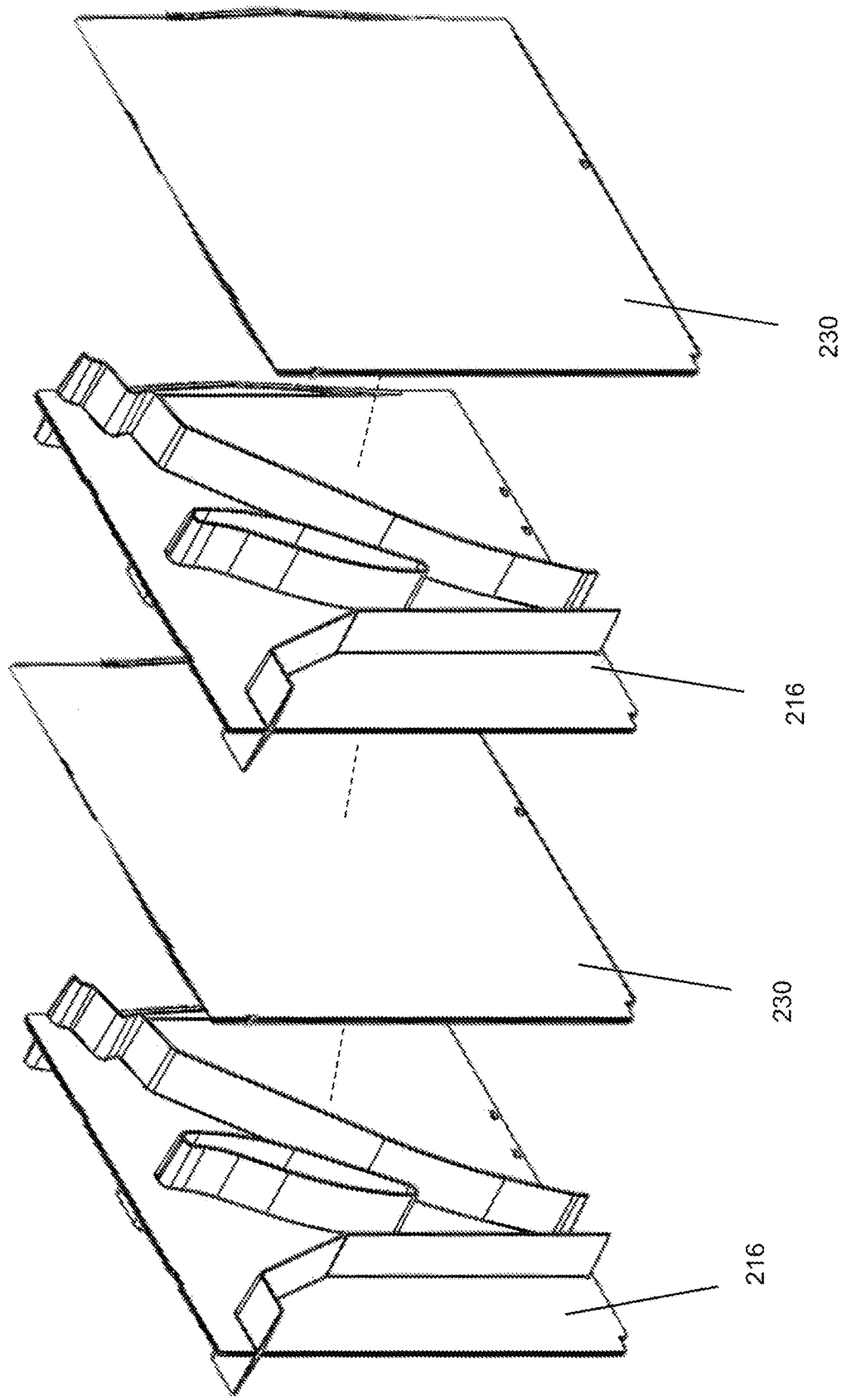
FIG. 5 shows an exploded view of an array of compact bidirectional alignment components and encasing panels according to one embodiment described herein.
Figure 6:
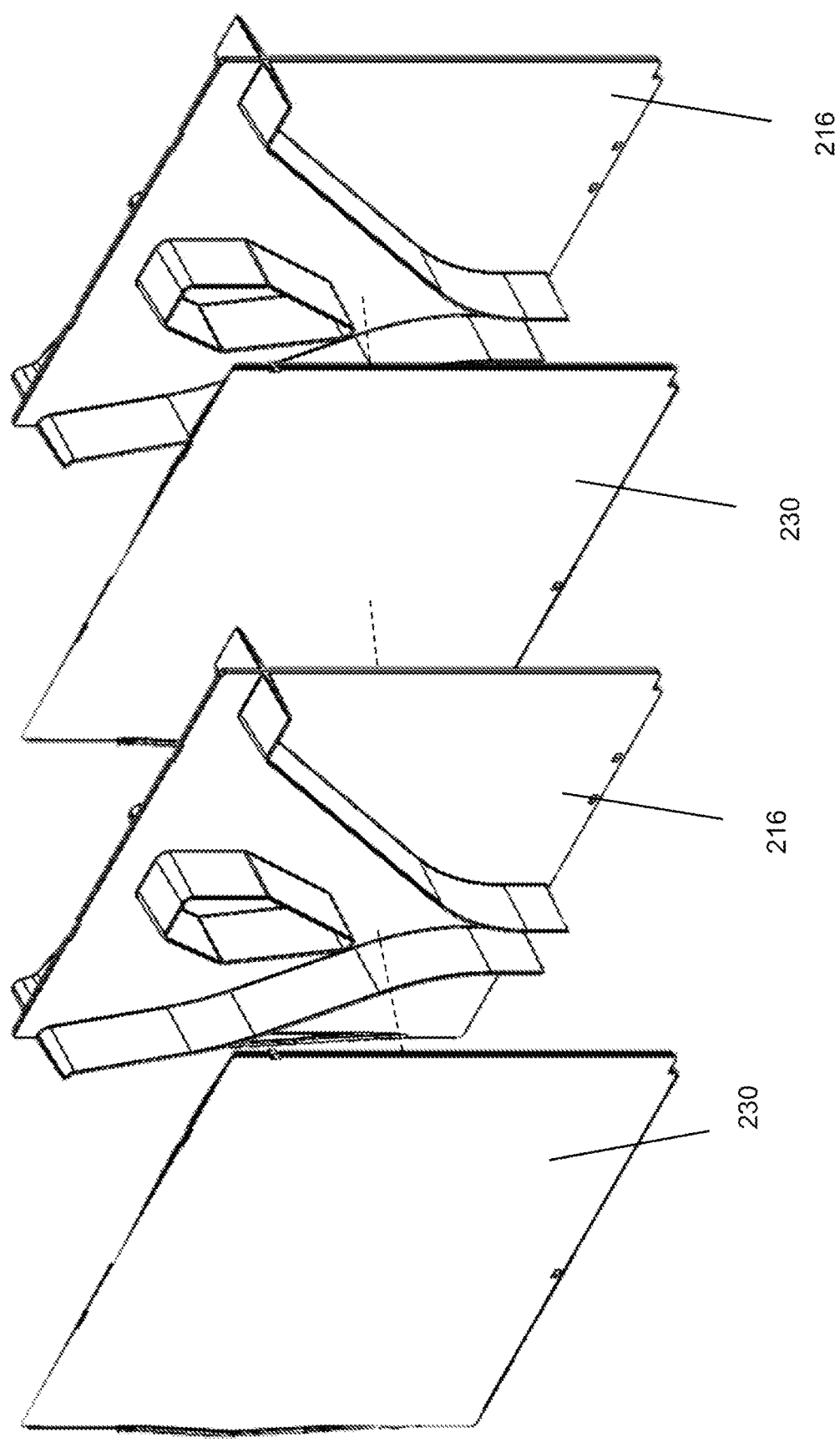
FIG. 6 shows an exploded view of an array of compact bidirectional alignment components and encasing panels according to one embodiment described herein.

FIGS. 5 and 6 show an exploded view of an array of compact bidirectional alignment components 216 and encasing panels 230 according to one embodiment described herein. In FIG. 5, the first side of the alignment component 216 is shown with an encasing panel 230 between each alignment component 216 and at the end of a plurality of alignment components 216. In FIG. 6, the second side of the alignment component 216 is shown with an encasing panel 230 between each alignment component 216 and at the end of a plurality of alignment components 216. A chute 210 is formed once the raised portion of alignment component 216 is contacted by the adjacent encasing panel 230. In some embodiments, this arrangement can be a space-saving design and can simplify manufacture of components for the collection system as described herein.

Figure 7B:
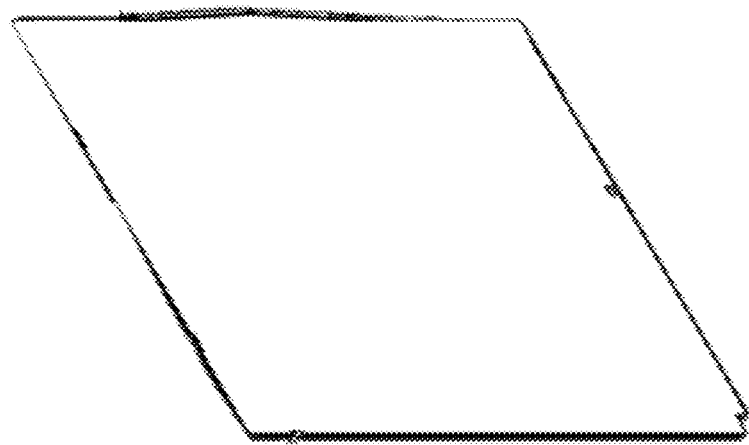
FIG. 7B shows a rear perspective view of an alignment component according to one embodiment described herein.
Figure 7A:
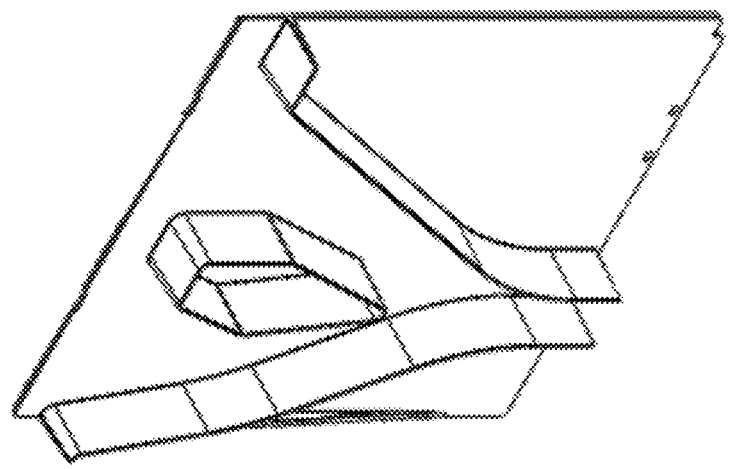
FIG. 7A shows a front perspective view of an alignment component according to one embodiment described herein.

FIGS. 7A and 7B show a perspective view of an alignment component 217 according to one embodiment described herein. FIG. 7A is a front view while FIG. 7B is a rear view. In some embodiments, an alignment component 217 may be unidirectional and only comprise raised components on one side of the alignment component 217. The rear side of an unidirectional alignment component 217 may serve as an encasing panel and form a chute when a plurality of unidirectional alignment components 217 are arranged adjacent to one another.

Figure 8B:
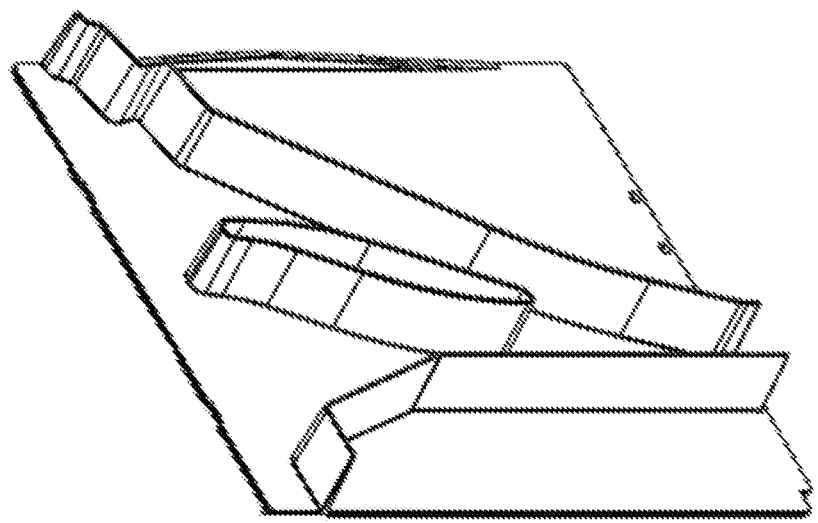
FIG. 8B shows a rear perspective view of an alignment component according to one embodiment described herein.
Figure 8A:
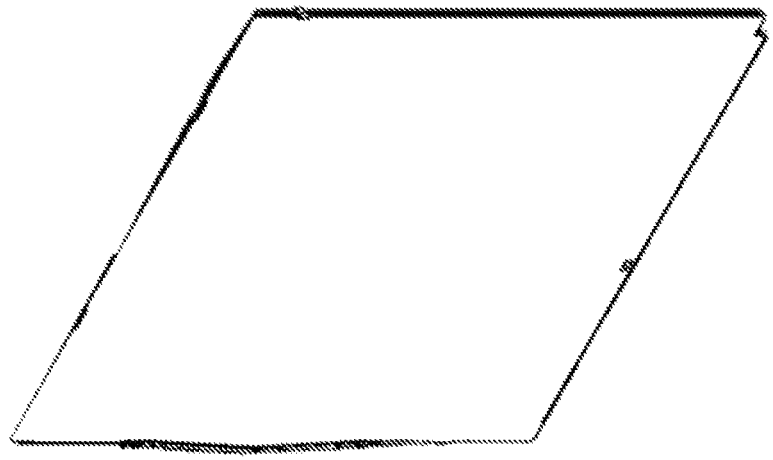
FIG. 8A shows a front perspective view of an alignment component according to one embodiment described herein.

FIGS. 8A and 8B show a perspective view of an alignment component 217 according to one embodiment described herein. FIG. 8A is a front view while FIG. 8B is a rear view. In some embodiments, an alignment component 217 may be unidirectional and only comprise raised components on one side of the alignment component 217. One side of an unidirectional alignment component 217 may serve as an encasing panel and form a chute when a plurality of unidirectional alignment components 217 are arranged adjacent to one another.

Figure 9:
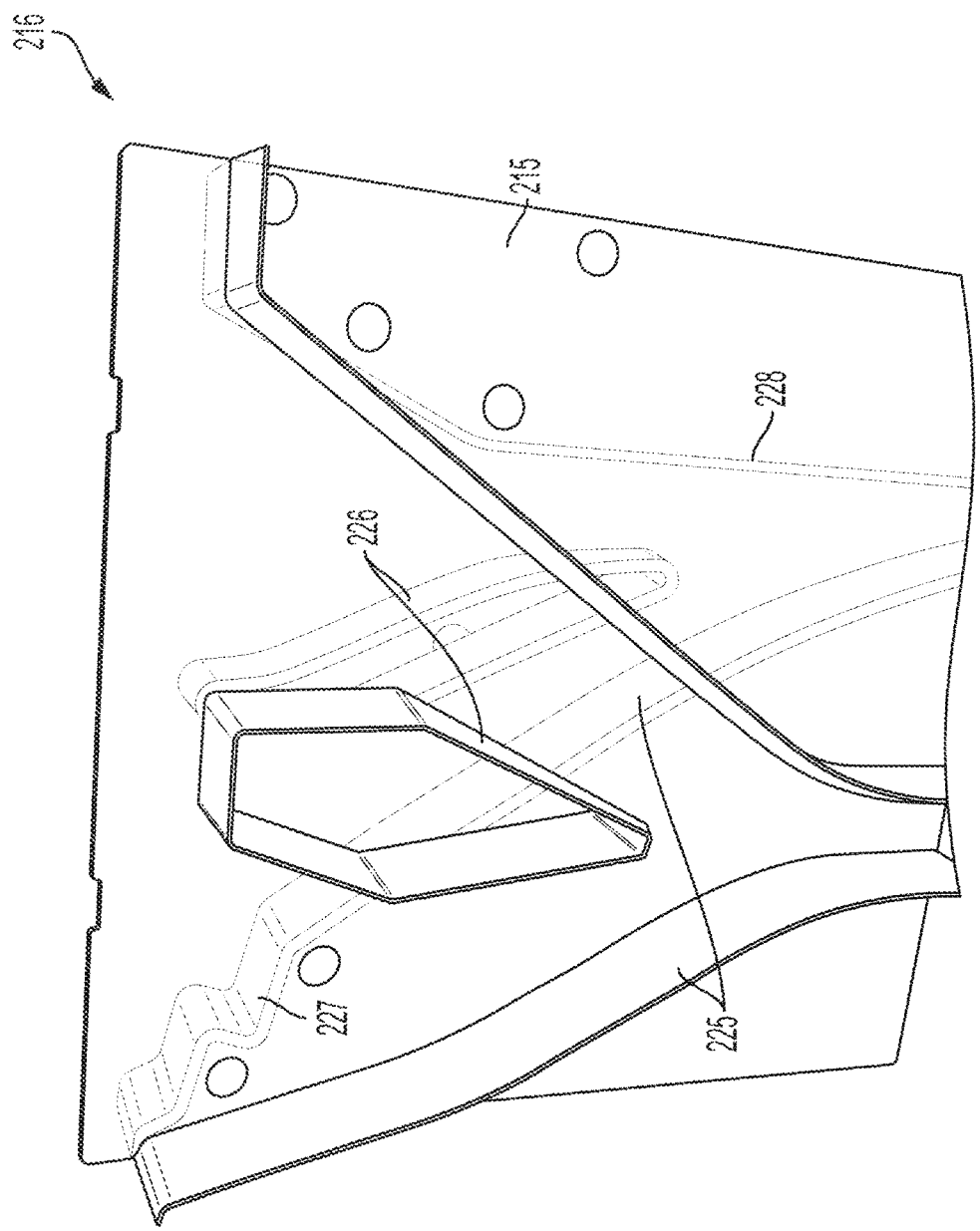
FIG. 9 is side view of a bidirectional alignment component according to according to one embodiment described herein.
Figure 10A:
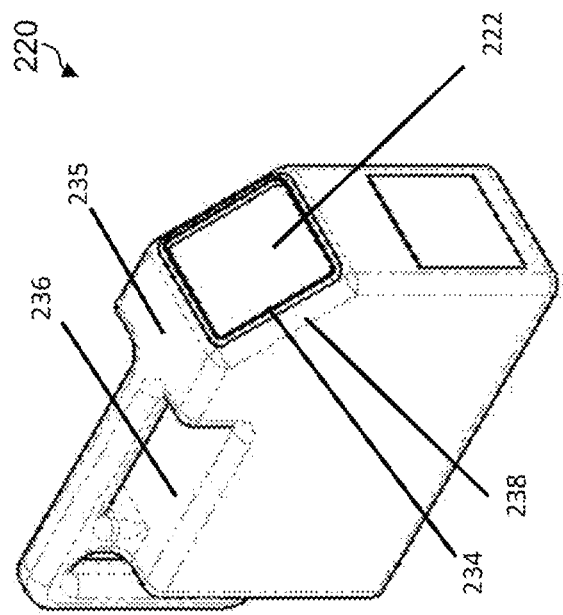
FIG. 10A is a top view of a collection container according to one embodiment described herein.
Figure 10B:
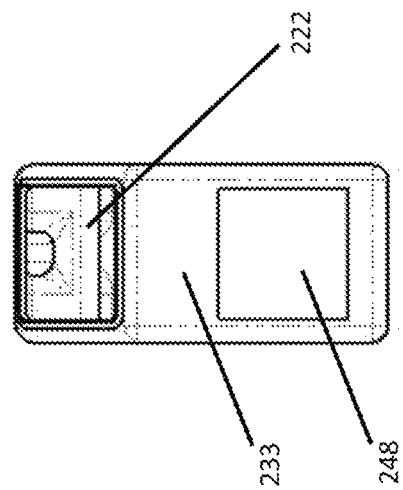
FIG. 10B is a perspective view of a collection container according to one embodiment described herein.
Figure 10C:
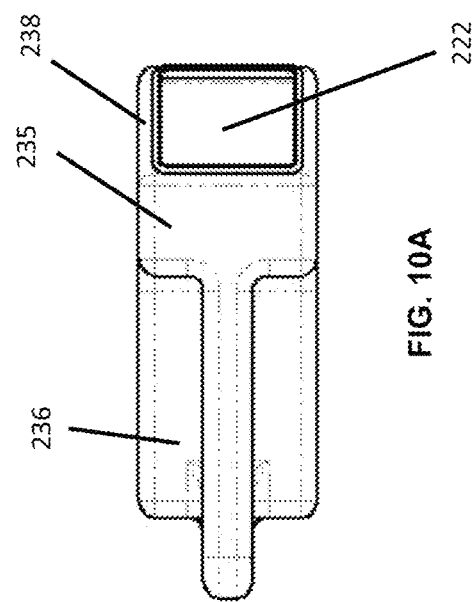
FIG. 10C is a side view of a collection container according to one embodiment described herein.
Figure 10D:
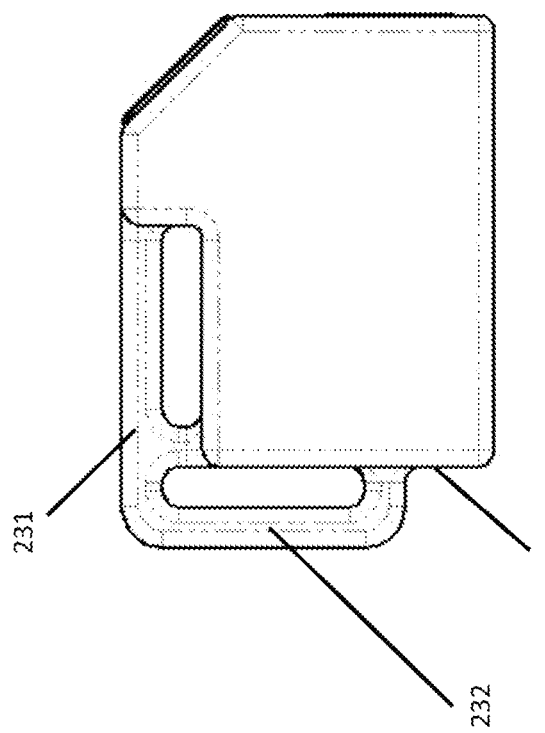
FIG. 10D is a front view of a collection container according to one embodiment described herein.

FIG. 9 shows a side view of a bidirectional alignment component 216 according to some embodiments of the system. As shown in FIGS. 4 and 9, the configuration of a first side of an alignment component 216 may differ from the configuration of a second side of an alignment component 216. In some cases, the configuration of a first side of an alignment component 215 may be the same as the configuration of a second side of an alignment component 215. In some cases, the alignment component 215 may be at least partially transparent. A partially transparent alignment component 215 can permit light to travel through the plurality of chutes to aid in visual identification of system status and troubleshooting. In some embodiments, the alignment component 216 may have a raised portion 225, a diverter 226, a two-step feature 227, a vertical section 228, and a notch 229.

Figure 11:
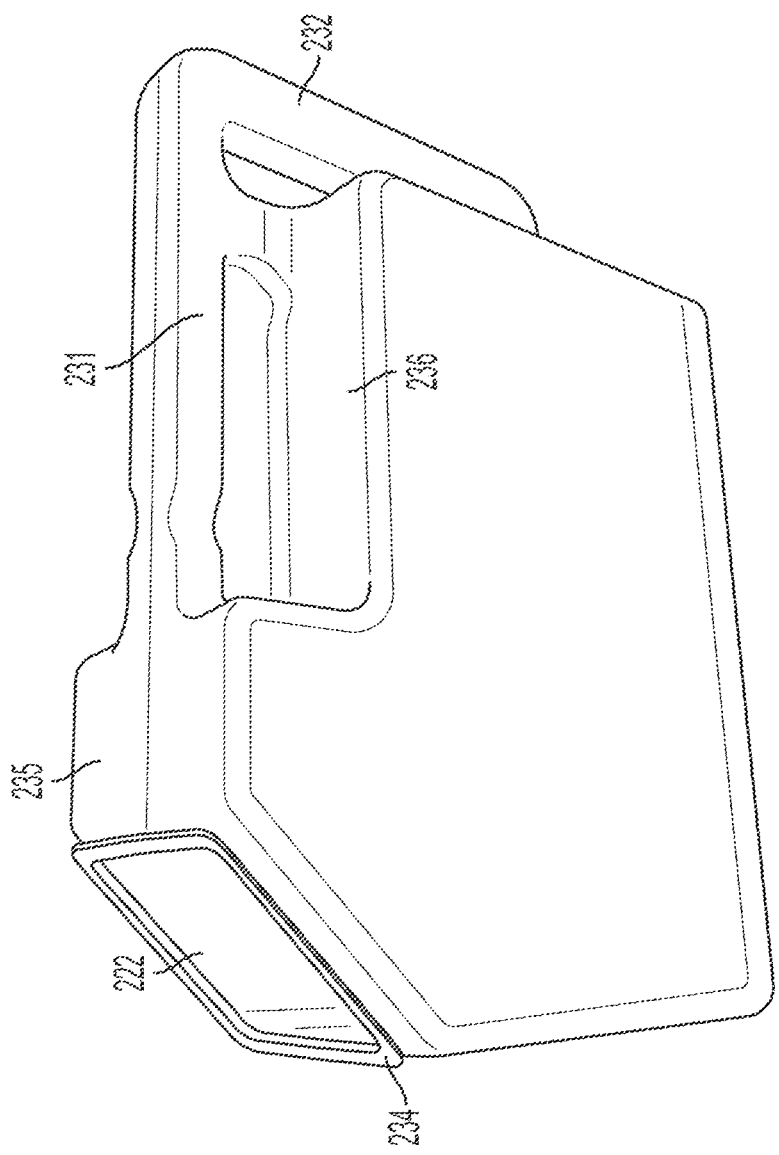
FIG. 11 is a perspective view of a collection container according to one embodiment described herein.
Figure 12:
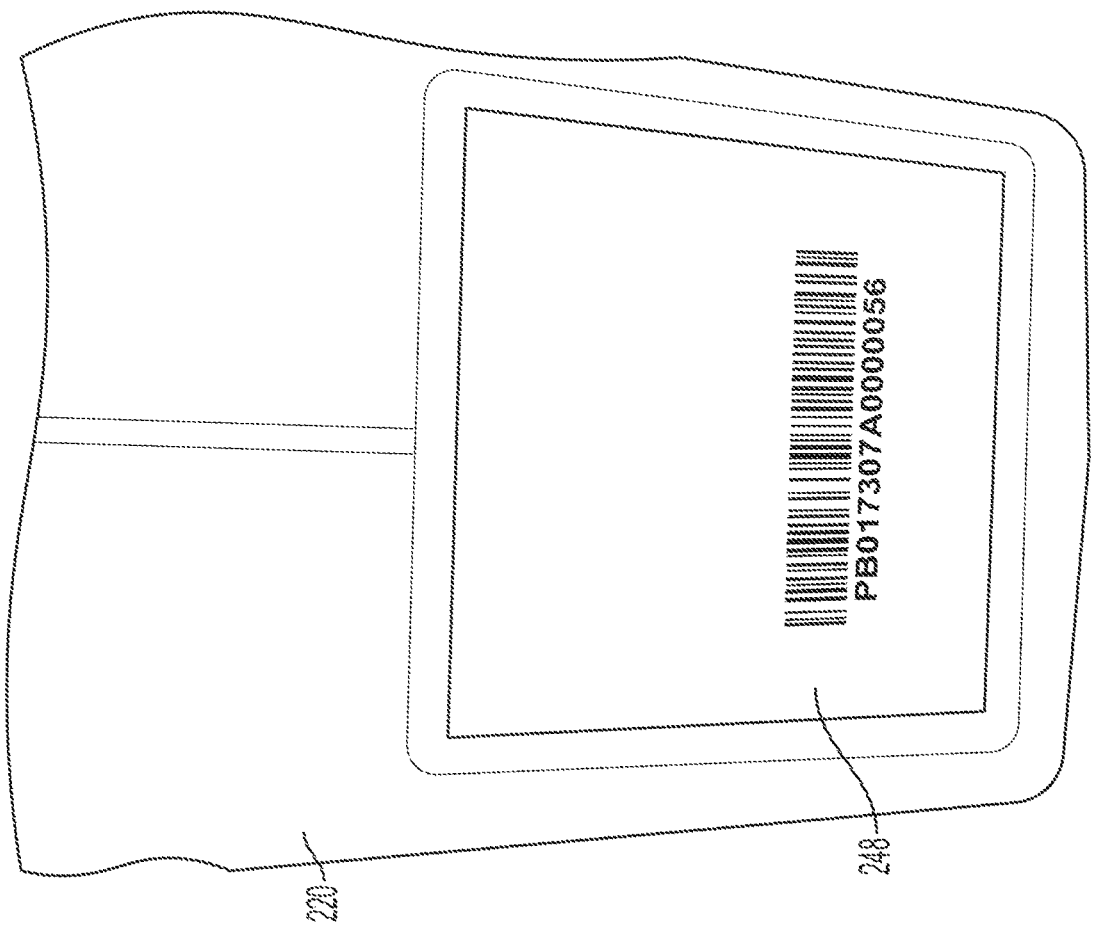
FIG. 12 shows a radio-frequency identification (RFID) tag on a collection container according to one embodiment described herein.

FIGS. 10A, 10B, 10C, 10D, and 11 show a collection container 220 according to one embodiment. The container 220 has an opening 222 defined by panel 238, where the opening 222 may be configured to receive vessels via a chute 210 and connector tube. In some embodiments, the opening may be configured to receive vessel from more than one chute or more than one connector tube. For example, a first handle 231 may be connected to the first top surface 235 and the second top surface 236. A second handle 232 may be connected to the rear wall 237 and the first handle 231. The front wall 233 may comprise a RFID tag 248. In the alternative, a RFID tag may be located on any other wall or surface of the container. A lip 234 about the opening 222 may be configured to mate with a cap. FIG. 11 shows a photograph of the container with lip 234. FIG. 12 shows a RFID tag 248 on the collection container 220. The RFID label may enable the container to be scanned and tracked throughout a system.

Figure 13:
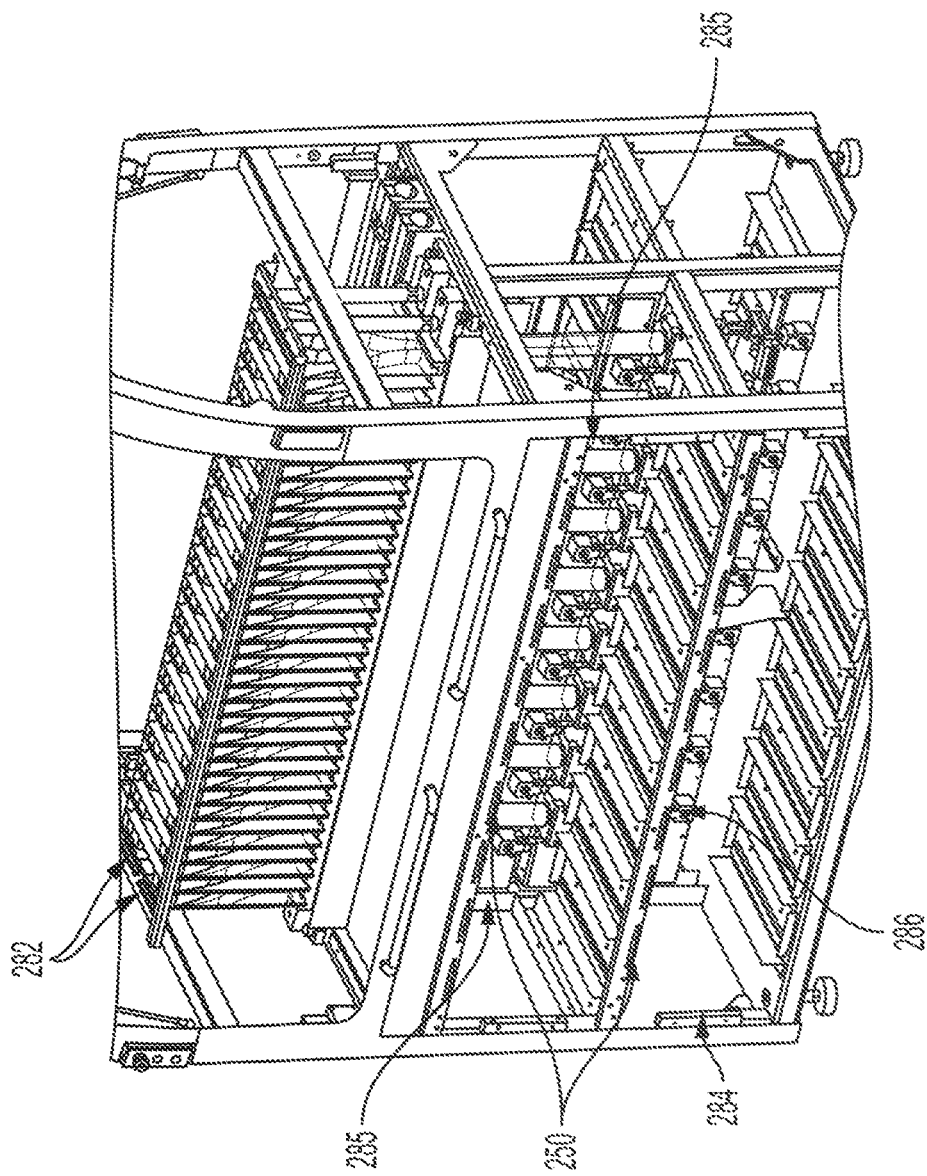
FIG. 13 shows feedback sensors on a collection bank according to one embodiment described herein.

FIG. 13 shows feedback sensors on the collection bank in some embodiments. Chute sensors 282 can identify an obstruction or error in the chute. The chute sensor 282 may monitor the front and rear chute. In some cases, the sensor may be an optical sensor that monitors chute conditions via a through beam design. Connector tube sensors 285 can identify an obstruction or error in the connector tube. The connector tube sensor 285 may monitor the front and rear tube and the top and bottom of the tube. In some cases, the sensor may be an optical sensor that monitors connector tube conditions via a through beam design. Container sensors 284 can identify presence of a container in the system and proper placement of the container. The container sensor 284 may monitor the front, rear, top, and bottom of the container. In some cases, the sensor may be an optical sensor that monitors container conditions via a through beam design. The container RFID sensor 286 can permit the system to track the container identity, location, sorting parameter, sample indicia, or other variable. The indicator light 250 can provide system conditions or instructions to an operator or monitoring system.

In some embodiments, each of the plurality of vessels may comprise a biological sample. For example, the vessel may be a tube that is cylindrical in shape. Optionally, the sample tube may comprise a cap. As used herein, the term "biological sample" encompasses any sample obtained from a biological source. A biological sample can, by way of non-limiting example, include blood, amniotic fluid, sera, urine, feces, epidermal sample, skin sample, cheek swab, sperm, amniotic fluid, cultured cells, bone marrow sample and/or chorionic villi. Convenient biological samples may be obtained by, for example, scraping cells from the surface of the buccal cavity. The term biological sample encompasses samples that have been processed to release or otherwise make available a nucleic acid (e.g., cell free DNA or RNA) or protein for detection as described herein. The biological sample may be obtained from a stage of life such as a fetus, young adult, adult, and the like. The biological sample may be obtained from a non-human animal (e.g., cow, dog, cat), including veterinary samples. The biological sample may be obtained from an animal product (e.g., meat) or a plant product (e.g., crops such as corn and the like). Fixed or frozen tissues also may be used. Thus, a biological sample may be a sample or specimen taken from a living being, such as a human patient. In many cases the sample could be a tissue or fluid specimen, such as blood, plasma, or urine. The vessels, in addition to a biological sample, may further comprise various preservatives and anti-coagulants to preserve the sample during processing and testing time.

In some embodiments, each of the plurality of vessels may comprise an environmental sample. As used herein, the term "environmental sample" encompasses any sample obtained from an environmental source. An environmental sample can, by way of non-limiting example, include water (fresh, oceanic, or drinking), soil, plants, biological materials, and wastes (liquids, solids or sludge). In some embodiments, each of the plurality of vessels may be a geological sample container that is cylindrical in shape and comprises a cap. As used herein, the term "geological sample" encompasses any sample obtained from a geological source. A geological sample can, by way of non-limiting example, include rock, ore, minerals, and sediment. In some embodiments, each of the plurality of vessels may be a chemical or pharmaceutical sample container that is cylindrical in shape and comprises a cap. As used herein, the term "chemical sample" encompasses any sample obtained from a chemical or pharmaceutical source. A chemical sample can, by way of non-limiting example, include liquids, slurries, solids (powder, pellet, or cake), gels, tablets, and wastes. For example, vessels may be used to carry any suitable material, such as drugs used in screening applications, processing samples used to assess the conversion level, rocks or similar substances, and so on, and are not limited to carrying blood or other body or tissue samples.

As discussed herein, the vessel may be a tube that is cylindrical in shape along a longitudinal axis. Optionally, the tube may comprise a cap. The systems described herein may be configured to supply vessels having various shapes or dimensions. In some embodiments, each of the plurality of vessels may range in size from 75 mm to about 125 mm in length and about 8 to about 16 mm in diameter. For example, the vessel may be 8 mm, 10 mm, 12 mm, 14 mm, or 16 mm in diameter. For example, the vessel may be 75 mm, 80 mm, 90 mm, 100 mm, 110 mm, or 125 mm in length.

The system described herein may be modular in design. In some embodiments, the system has a throughput of more than 8,000 vessels per hour. In other embodiments, the system has a throughput of more than 1,000, more than 2,000, more than 3,000, more than 4,000, more than 5,000, more than 8,000, more than 10,000, more than 16,000, more than 20,000, or more than 30,000 vessels per hour. In some embodiments, the system has a throughput of 1,000 to 30,000 vessels per hour, 2,000 to 16,000 vessels per hour, or 3,000 to 8,000 vessels per hour. The system is designed to minimize human interaction during the supplying of the vessels.

In some embodiments, system may further comprise a shield configured to cover the system. In certain embodiments, the shield may be substantially transparent. In one example, the system has a cover, such as gull wing doors or other types of doors, that are easy to open, yet provide protection from dust or other substances.

In some embodiments, the system may comprise a plurality of sensors that provide feedback to a central processing unit. In some embodiments, a feeding system may comprise sensors related to the level in a presorting container such as a bin or feed bin and vessel motion on a transporter and/or transfer belt that may be used to deliver vessels to an entry point of the collection system. The system may slow or stop portions of system or may reallocate assignments within the system based on the feedback received from a plurality of sensors.

In some embodiments, the system may have a footprint of less than 43 feet by 9 feet. In some embodiments, a collection bank has a footprint of less than 18 feet by 4 feet. In some embodiments, a collection bank has a footprint of less than 4 feet by 9 feet. In some embodiments, the system can be operated in a space measuring no more than 51 feet by 21 feet.

Also disclosed are methods of using the collection system wherein vessels delivered to an entry point of a collection system are dispersed into collection containers (e.g., bins) as disclosed herein. In some examples, a method of using a system for receiving a plurality of vessels may comprise comprising delivering a plurality of vessels to an entry point of the system and dispersing the plurality of vessels into a plurality of collection containers. The system may comprise (i) a plurality of alignment components, where each of the plurality of alignment components may be configured to individually direct each of the plurality of vessels from an entry position to a collection point within the collection system; (ii) a plurality of encasing panels adjacent to each of the plurality of alignment components, wherein each of the plurality of encasing panels may be configured to enclose each of the plurality of alignment components; (iii) a plurality of collection containers comprising an opening, wherein each of the plurality of containers may be configured to receive and hold each of the plurality of vessels at a particular collection point; and (iv) a support structure configured to house each of the plurality of alignment components, encasing panels, and collection containers, wherein each vessel may be configured to hold a sample.

Having described several aspects of this invention, it should be appreciated that various alterations, modifications and improvements will occur to those of skill in the art. Such alterations, modifications and improvements are intended to be part of this disclosure and are intended to be within the spirit and scope of the invention. Thus, the description and drawings herein are intended to be illustrative, not limiting. The phraseology and terminology used herein is for the purpose of description and should not be regarded as limiting.

Illustrative Embodiments of Suitable Systems and Methods

As used below, any reference to methods, products, or systems is understood as a reference to each of those methods, products, or systems disjunctively (e.g., "Illustrative embodiment 1-4 is understood as illustrative embodiment 1, 2, 3, or 4.").

Illustrative embodiment 1 is a system for receiving a plurality of vessels, comprising: a collection bank configured to receive a plurality of vessels, wherein each vessel is configured to hold a sample and wherein the collection bank comprises: (i) a plurality of alignment components, wherein each of the plurality of alignment components is configured to individually direct each of the plurality of vessels from an entry position to a collection point within the collection bank; (ii) a plurality of encasing panels adjacent to each of the plurality of alignment components, wherein each of the plurality of encasing panels is configured to enclose each of the plurality of alignment components; (iii) a plurality of collection containers comprising an opening, wherein each of the plurality of containers is configured to receive and hold at least some of the plurality of vessels at a particular collection point; and (iv) a support structure configured to house each of the plurality of alignment components, encasing panels, and collection containers.

Illustrative embodiment 2 is the system of any preceding or subsequent illustrative embodiment, wherein each of the plurality of vessels is a biological sample tube that is cylindrical in shape and comprises a cap.

Illustrative embodiment 3 is the system of any preceding or subsequent illustrative embodiment, wherein each of the plurality of vessels ranges in size from 75 mm to about 125 mm in length and about 8 to about 16 mm in diameter.

Illustrative embodiment 4 is the system of any preceding or subsequent illustrative embodiment, wherein each of the plurality of alignment components is configured to reorient each of the plurality of vessels from a substantially horizontal position to a substantially vertical position.

Illustrative embodiment 5 is the system of any preceding or subsequent illustrative embodiment, wherein the plurality of alignment components and encasing panels are configured in a row and positioned in a vertical orientation with an encasing panel separating each of the plurality of alignment components in the row and an encasing panel at each end of the row.

Illustrative embodiment 6 is the system of any preceding or subsequent illustrative embodiment, wherein the support structure comprises at least one container shelf configured to hold the plurality of collection containers.

Illustrative embodiment 7 is the system of any preceding or subsequent illustrative embodiment, wherein the shelf comprises a series of slots configured to align with the opening of each of the plurality of collection containers when the containers are placed in the system.

Illustrative embodiment 8 is the system of any preceding or subsequent illustrative embodiment, wherein the system comprises an upper container shelf and a lower container shelf.

Illustrative embodiment 9 is the system of any preceding or subsequent illustrative embodiment, wherein the slots of the upper and lower container shelf are offset such that the upper slots are approximately one half a container width offset from the lower slots.

Illustrative embodiment 10 is the system of any preceding or subsequent illustrative embodiment, further comprising at least one positioning bar configured to align each of the plurality of alignment components in the support structure.

Illustrative embodiment 11 is the system of any preceding or subsequent illustrative embodiment, wherein the system comprises a set up upper positioning bars and a set of lower positioning bars.

Illustrative embodiment 12 is the system of any preceding or subsequent illustrative embodiment, further comprising a connector tube, wherein the connector tube is configured to protrude from the slots in the container shelf and connect the opening of each of the plurality of collection containers to a designated chute.

Illustrative embodiment 13 is the system of any preceding or subsequent illustrative embodiment, wherein the plurality of alignment components and encasing panels are configured to align in a row on the support structure such that a pair of alignment components and encasing panels produce a confined space configured to funnel each of the plurality of vessels from the top of each of the plurality of alignment components to the bottom of each of the plurality of alignment components, wherein a top inlet of the confined space is wider than a bottom outlet, wherein the bottom outlet is approximately the same size as the opening of one of the collection containers and a connector tube, wherein the support structure comprises a top and a bottom container shelf, wherein each shelf comprises a series of slots configured to align with the opening of each of the plurality of collection containers, wherein the slots of the upper and lower container shelf are offset such that the upper slots are approximately one half a container width offset from the lower slots, wherein each of the plurality of alignment components has a first side and a second side, and wherein the first side of each of the plurality of alignment components and encasing panels funnel each of the plurality of vessels to a designated collection container staged on the front side of the system and the second side of each of the plurality of alignment components and encasing panels funnel each of the plurality of vessels to designated collection container staged on the rear side of the system, wherein the connector tube is configured to protrude from the slots in each container shelf and connect the opening of each of the plurality of collection containers to the confined space of each pair of the plurality of alignment components and encasing panels.

Illustrative embodiment 14 is the system of any preceding or subsequent illustrative embodiment, wherein each of the plurality of collection containers comprises a radio frequency identification (RFID) tag.

Illustrative embodiment 15 is the system of any preceding or subsequent illustrative embodiment, wherein the RFID tag is configured to receive location and vessel information when each of the plurality of containers is loaded in the support structure.

Illustrative embodiment 16 is the system of any preceding or subsequent illustrative embodiment, wherein the support structure comprises an indicator light for each of the plurality of collection containers, wherein in the light is configured to provide feedback on an operating condition of each of the plurality of collection containers.

Illustrative embodiment 17 is the system of any preceding or subsequent illustrative embodiment, wherein each of the plurality of collection containers is configured to be associated with a chute formed by one of the plurality of encasing panels and one of the plurality of alignment components, wherein the association is based on a sorting parameter of each of the plurality of vessels.

Illustrative embodiment 18 is the system of any preceding or subsequent illustrative embodiment, wherein the collection bank further comprises a cover configured to provide access to each of the plurality of alignment components and each of the plurality of collection containers.

Illustrative embodiment 19 is the system of any preceding or subsequent illustrative embodiment, wherein the cover comprises a gull wing door.

Illustrative embodiment 20 is the system of any preceding or subsequent illustrative embodiment, wherein the system is modular.

Illustrative embodiment 21 is a method of using a system for receiving a plurality of vessels, comprising: delivering a plurality of vessels to an entry point of the system; and dispersing the plurality of vessels into a plurality of collection containers in a collection bank, wherein the system comprises: (i) a plurality of alignment components, wherein each of the plurality of alignment components is configured to individually direct each of the plurality of vessels from an entry position to a collection point within the collection bank; (ii) a plurality of encasing panels adjacent to each of the plurality of alignment components, wherein each of the plurality of encasing panels is configured to enclose each of the plurality of alignment components; (iii) a plurality of collection containers comprising an opening, wherein each of the plurality of containers is configured to receive and hold at least some of the plurality of vessels at a particular collection point; and (iv) a support structure configured to house each of the plurality of alignment components, encasing panels, and collection containers, wherein each vessel is configured to hold a sample.

Illustrative embodiment 22 is a system for guiding a plurality of vessels, comprising a plurality of alignment components and encasing panels configured in a row, wherein the alignment components are encasing panels are positioned in a vertical orientation with an encasing panel separating each of the plurality of alignment components in the row and an encasing panel at each end of the row.

Illustrative embodiment 23 is the system of any preceding or subsequent illustrative embodiment, wherein each of the plurality of encasing panels and alignment components are configured to contact each other to form a chute and reorient a vessel from a substantially horizontal orientation to a substantially vertical orientation.

Illustrative embodiment 24 is the system of any preceding or subsequent illustrative embodiment, wherein each of the plurality of alignment components comprises a first side and a second side.

Illustrative embodiment 25 is the system of any preceding or subsequent illustrative embodiment, wherein the first side and the second side of each of the plurality of alignment components each comprise a raised portion, wherein the raised portion is configured to form a chute and provide a contact surface to reorient and funnel each of the plurality of vessels within the chute.

Illustrative embodiment 26 is the system of any preceding or subsequent illustrative embodiment, wherein the chute ranges from 1 to 10 cm in depth.

Illustrative embodiment 27 is the system of any preceding or subsequent illustrative embodiment, wherein an inlet of the chute is wider than an outlet of the chute.

Illustrative embodiment 28 is the system of any preceding or subsequent illustrative embodiment, wherein the width of the inlet of the chute approximates the length of a vessel being delivered by the chute and the width of the outlet approximates the width of the vessel being delivered.

Illustrative embodiment 29 is the system of any preceding or subsequent illustrative embodiment, wherein each chute is configured to direct each of the plurality of vessels from a plurality of entry points to a single collection point.

Illustrative embodiment 30 is the system of any preceding or subsequent illustrative embodiment, wherein the chute further comprises a diverter configured to direct each of the plurality of vessels to a front or rear section of each alignment component.

Illustrative embodiment 31 is the system of any preceding or subsequent illustrative embodiment, wherein the chute on the first side of the alignment component is configured to direct each of the plurality of vessels to the front section of the alignment component.

Illustrative embodiment 32 is the system of any preceding or subsequent illustrative embodiment, wherein the chute further comprises a two-step feature at the rear side to further direct and reorient each of the plurality of vessels entering the chute from a rear entry point.

Illustrative embodiment 33 is the system of any preceding or subsequent illustrative embodiment, wherein the chute further comprises a substantially vertical section and the diverter is angled away from the two-step feature.

Illustrative embodiment 34 is the system of any preceding or subsequent illustrative embodiment, wherein the chute on the second side of the alignment component is configured to direct each of the plurality of vessels to the rear section of the alignment component.

Illustrative embodiment 35 is the system of any preceding or subsequent illustrative embodiment, wherein a diverter on the second side of the alignment component is substantially diamond-shaped.

Illustrative embodiment 36 is the system of any preceding or subsequent illustrative embodiment, wherein each of the plurality of alignment components further comprises a notch at the bottom of the front edge configured to align the plurality of alignment components within the system.

Illustrative embodiment 37 is an apparatus for guiding an article, comprising: a raised portion in a substantially Y-shape and a first side and a second side, wherein the raised portion provides a contact surface for the article and configured to direct an article from a top of the apparatus to an outlet at the bottom of the apparatus.

Illustrative embodiment 38 is the apparatus of any preceding or subsequent illustrative embodiment, wherein the raised portion ranges from 5 to about 40 cm in depth.

Illustrative embodiment 39 is the apparatus of any preceding or subsequent illustrative embodiment, wherein a distance between the raised portion at the top of the apparatus is larger than as distance between the raised portion at the bottom of the apparatus.

Illustrative embodiment 40 is the apparatus of any preceding or subsequent illustrative embodiment, wherein the distance between the raised portions at the inlet approximates the length of a vessel being delivered by the chute and the distance between the raised portions at the outlet approximates the length of a vessel being delivered by the chute.

Illustrative embodiment 41 is the apparatus of any preceding or subsequent illustrative embodiment, further comprising a diverter configured to direct the article to a front or rear section of each apparatus.

Illustrative embodiment 42 is the apparatus of any preceding or subsequent illustrative embodiment, wherein the first side is configured to direct the article to the front section of the apparatus.

Illustrative embodiment 43 is the apparatus of any preceding or subsequent illustrative embodiment, further comprising a two-step feature at the rear side to further direct and reorient each article entering the apparatus from a rear entry point.

Illustrative embodiment 44 is the apparatus of any preceding or subsequent illustrative embodiment, further comprising a substantially vertical section, wherein the diverter is angled away from the two-step feature.

Illustrative embodiment 45 is the apparatus of any preceding or subsequent illustrative embodiment, wherein the second side is configured to direct each article to the rear section of the apparatus.

Illustrative embodiment 46 is the apparatus of any preceding or subsequent illustrative embodiment, wherein a diverter on the second side is substantially diamond-shaped.

Illustrative embodiment 47 is the apparatus of any preceding or subsequent illustrative embodiment, further comprising a notch at the bottom of the front edge.

Illustrative embodiment 48 is a collection apparatus comprising a substantially rectangular base and walls connected to the base, wherein the base and walls define an interior volume of the apparatus and the walls comprise a front wall, a rear wall, a first side wall, and a second side wall; a top connected to the first side wall and second side wall, wherein the top comprises a first top surface and a second top surface that are substantially perpendicular to the first side wall and second side wall; a first handle connected to the first top surface and second top surface; and a second handle connected to the rear wall of the apparatus.

Illustrative embodiment 49 is the collection apparatus of any preceding or subsequent illustrative embodiment, wherein the first handle is substantially coplanar with the first top surface of the apparatus.

Illustrative embodiment 50 is the collection apparatus of any preceding or subsequent illustrative embodiment, wherein the second handle is substantially perpendicular to the first handle.

Illustrative embodiment 51 is the collection apparatus of any preceding or subsequent illustrative embodiment, wherein the first handle is connected to the second handle.

Illustrative embodiment 52 is the collection apparatus of any preceding or subsequent illustrative embodiment, further comprising a panel that defines an opening.

Illustrative embodiment 53 is the collection apparatus of any preceding or subsequent illustrative embodiment, wherein the apparatus is configured to receive a plurality of implements through the opening.

Illustrative embodiment 54 is the collection apparatus of any preceding or subsequent illustrative embodiment, wherein the implements comprise sample vessels.

Illustrative embodiment 55 is the collection apparatus of any preceding or subsequent illustrative embodiment, wherein the opening is substantially rectangular in shape and the panel is connected to the first top surface to the front wall.

Illustrative embodiment 56 is the collection apparatus of any preceding or subsequent illustrative embodiment, wherein the panel further comprises a lip at the edge of the opening, wherein the lip is configured to mate with a cap.

Illustrative embodiment 57 is the collection apparatus of any preceding or subsequent illustrative embodiment, wherein a size of the opening ranges from 5 to 25 cm in width and 5 to 25 cm in height.

Illustrative embodiment 58 is the collection apparatus of any preceding or subsequent illustrative embodiment, wherein the apparatus comprises an injection moldable polymer.

That which is claimed:

1. A system for guiding a plurality of vessels, comprising:
a plurality of chutes comprising an inlet and an outlet;
a plurality of alignment components comprising a first side and a second side, wherein the first side comprises a first element and a diverter, wherein the first element and the diverter are connected to and protrude from the first side of each of the plurality of alignment components, and wherein the first element and the diverter are perpendicular to the first side of each of the plurality of alignment components; and
a plurality of encasing panels configured in a row, wherein the row has a first end and a second end, wherein the row has an encasing panel at the first end of the row and an encasing panel at the second end of the row,
wherein the plurality of alignment components and the plurality of encasing panels are positioned in a vertical orientation with an encasing panel in contact with and separating each of the plurality of alignment components in the row to form each of the plurality of chutes,
wherein the diverter separates the inlet of each of the plurality of chutes into a first inlet and a second inlet and guides each of the plurality of vessels through a first path of each of the plurality of chutes to the outlet or through a second path of each of the plurality of chutes to the outlet.

2. The system of claim 1, wherein each of the plurality of chutes reorients each of the plurality of vessels from an orientation of a horizontal longitudinal axis to an orientation of a vertical longitudinal axis.

3. The system of claim 1, wherein each of the plurality of chutes provide a contact surface to reorient and funnel each of the plurality of vessels within each of the plurality of chutes.

4. The system of claim 1, wherein the inlet of each of the plurality of chutes is wider than the outlet of each of the plurality of chutes.

5. The system of claim 4, wherein a width of the inlet ranges in size from 75 mm to 125 mm and a width of the outlet ranges from about 8 mm to 16 mm.

6. The system of claim 4, wherein at least one of the plurality of chutes receives at least one of the plurality of vessels from more than one source along the inlet.

7. The system of claim 1, wherein the second side comprises a second element and a second diverter, wherein the second element and the second diverter are connected to and protrude from the second side of each of the plurality of alignment components, wherein the second element and the second diverter are perpendicular to the second side of each of the plurality of alignment components, and wherein the second side is opposite of the first side,
wherein the second element on the second side forms a chute when the second element of one of the plurality of alignment components contacts an adjacent encasing panel of one of the plurality of encasing panels in the row increasing a quantity of chutes within the systems.

8. The system of claim 1, wherein the first element on the first side comprises a two-step feature to further direct and reorient each of the plurality of vessels entering each of the plurality of chutes.

9. The system of claim 7, wherein the second diverter on the second side of the plurality of alignment components is diamond.

10. The system of claim 1, wherein each of the plurality of alignment components further comprises a notch to align the plurality of alignment components within the system.

11. The system of claim 1, wherein the first element and the second element are Y-shaped.

12. The system of claim 3, wherein each of the plurality of vessels is a sample tube that is cylindrical in shape and comprises a cap.

13. The system of claim 12, wherein the sample tube comprises a biological sample, an environmental sample, a geological sample, or a chemical sample.

14. The system of claim 1, wherein the system is modular.

* * * * *